Figure 1:
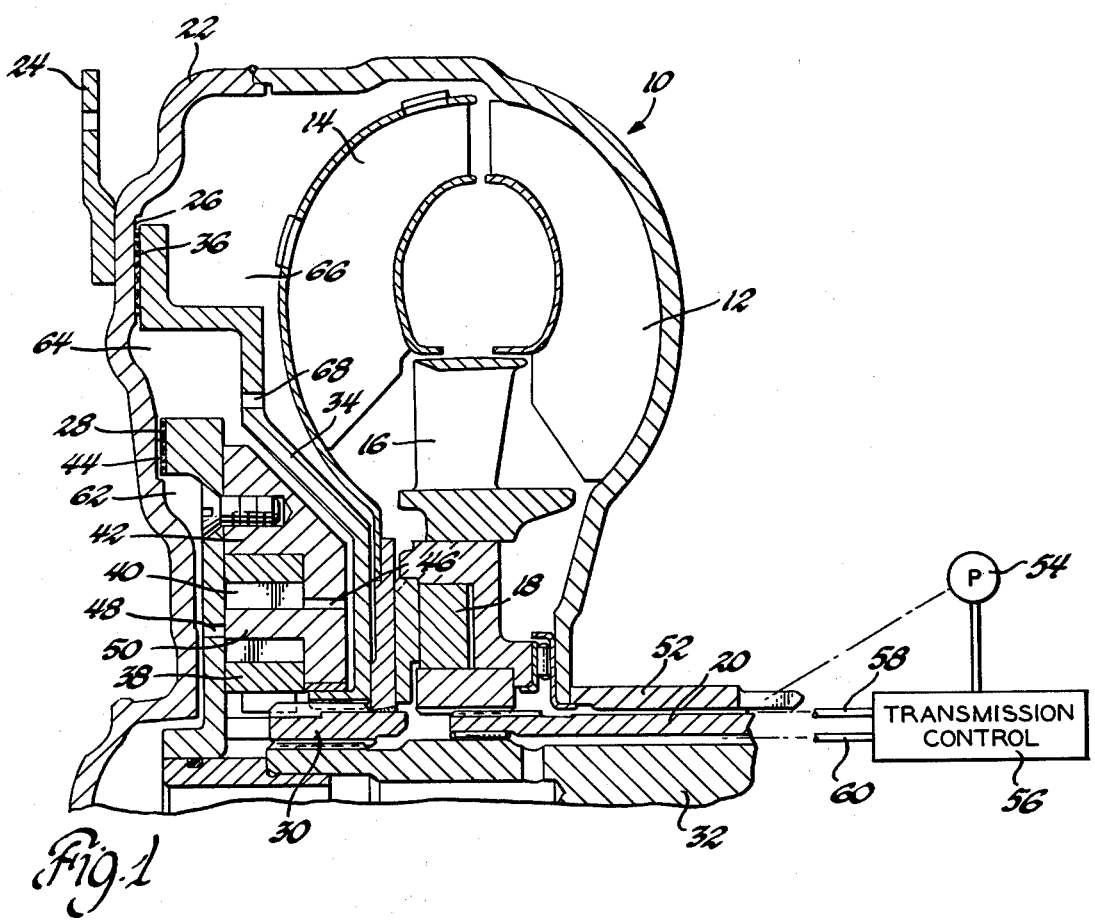

United States Patent [19]

Malloy

[11] 4,181,203
[45] Jan. 1, 1980

[54] CONTROL FOR A TORQUE CONVERTER SLIPPING CLUTCH

[75] Inventor: John D. Malloy, Troy, Mich.

[73] Assignee: General Motors Corporation, Detroit, Mich.

[21] Appl. No.: 933,159

[22] Filed: Aug. 14, 1978

[51] Int. Cl.$^2$ .................... F16D 39/00; F16H 41/18
[52] U.S. Cl. ................................. 192/3.3; 192/3.31; 192/103 F
[58] Field of Search .................... 192/3.29, 3.3, 3.31, 192/85 AA, 86, 103 F

[56] References Cited

U.S. PATENT DOCUMENTS

| | | | |
|---|---|---|---|
| 2,178,050 | 10/1939 | Peterson | 192/85 AA |
| 3,684,064 | 8/1972 | Hamilton | 192/3.31 |
| 3,730,315 | 5/1973 | Annis et al. | 192/3.3 |
| 3,752,280 | 8/1973 | Cheek | 192/103 F X |
| 3,966,032 | 6/1976 | Koivunen | 192/103 F X |

*Primary Examiner*—Benjamin Wyche
*Attorney, Agent, or Firm*—Donald F. Scherer

[57] ABSTRACT

A positive displacement hydraulic mechanism for controlling the engagement of a slipping clutch in parallel drive relationship with a torque converter. The hydraulic device is operable in response to the speed differential between the impeller (input) and turbine (output) of the torque converter to control fluid flow from one side of a single plate clutch thereby controlling the pressure differential across the plate of the clutch so that the engagement force of the clutch is controlled to maintain a fixed speed differential between the turbine and impeller.

1 Claim, 2 Drawing Figures

CONTROL FOR A TORQUE CONVERTER SLIPPING CLUTCH

This invention relates to controls for torque converter slipping clutches and more particularly to controls which are responsive to the speed differential in the torque converter to control clutch engagement.

Prior art clutch controls which are responsive to speed differential may be seen in U.S. Pat. Nos. 3,734,251 to Annis et al, issued May 22, 1973, and 3,966,032 to Koivunen, issued June 29, 1976, both assigned to the assignee of the present invention. The Annis et al patent describes a control system in which the clutch engagement force is proportional to thrust within the torque converter which is proportional to speed differential. The Koivunen patent describes a clutch control in which a valve mechanism is responsive to the input and output speeds of a clutch or torque converter to control the clutch engagement such that slipping occurs at a fixed speed differential between the input and output members of a torque converter.

The present invention uses a positive displacement hydraulic device, such as a pump, to control the fluid flow from one side of a single plate clutch to thereby control the pressure on that side of the clutch which, of course, controls the engagement force of the clutch. The clutch will be maintained in a slipping relationship between the input and output members since, if the clutch should go to a full lock-up condition, there will be no output flow from the hydraulic device such that the pressure differential across the single plate clutch will diminish to zero thereby opening the clutch. The control system will also disengage the clutch during coasting when the torque converter turbine overruns the impeller since during this operation the hydraulic device will be operating in such a manner so as to distribute fluid to the one side of the single plate clutch rather than distributing fluid from that side of the clutch to exhaust.

It is an object of this invention to provide an improved control for a torque converter slipping clutch wherein the clutch, when engaged, limits the speed differential between the input and output elements of a torque converter.

It is another object of this invention to provide in a torque converter slipping clutch an improved control for a single plate clutch wherein the pressure differential engaging the clutch is controlled by a positive displacement hydraulic unit which displaces fluid in proportion to the speed differential between the input and output members of the clutch to control the pressure on one side of the clutch plate thereby controlling the engagement force.

Figure 2:
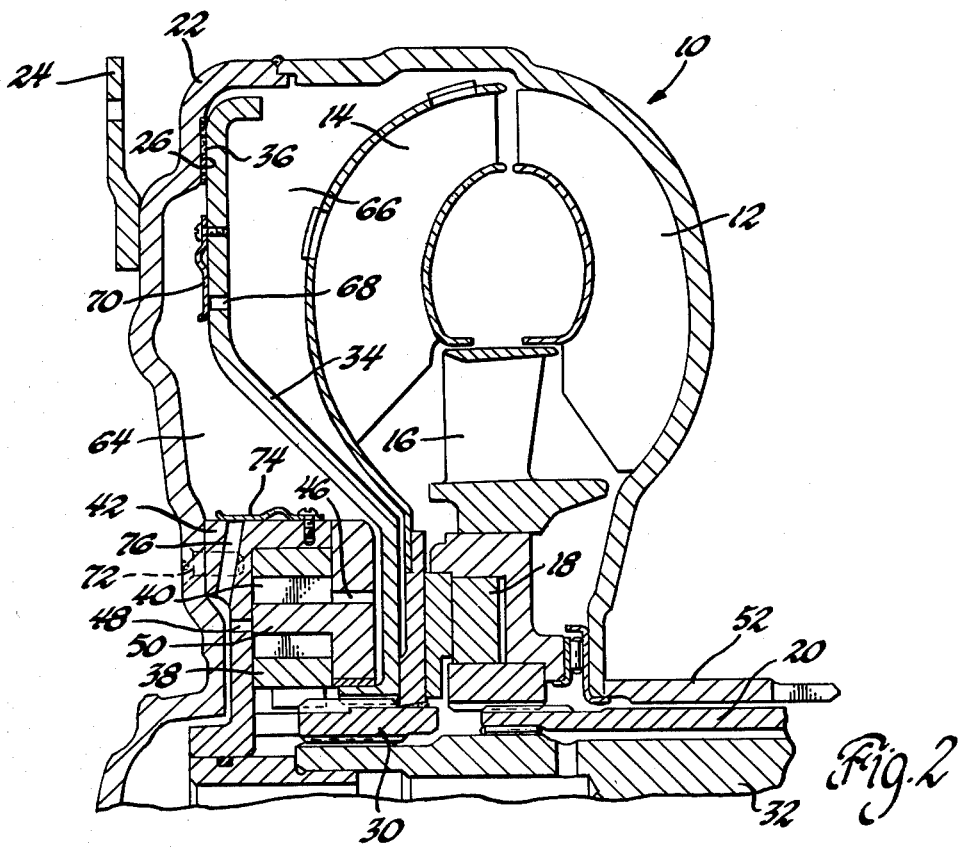

These and other objects and advantages of the present invention will be more apparent from the following description and drawings in which:

FIG. 1 is a cross sectional elevational view of a torque converter and clutch incorporating one embodiment of the present invention; and FIG. 2 is a cross sectional elevational view of a torque converter clutch having a second embodiment of the present invention.

Referring to FIG. 1, there is seen a torque converter 10 having an impeller 12, a turbine 14 and a stator 16 in fluid communication in a well-known conventional manner. The stator 16 is connected through a conventional one-way device 18 to a stator shaft 20 which is connected to the transmission case, not shown. The impeller 12 is secured to an input shell 22 which in turn is secured to an engine, not shown, through a plurality of drive lugs such as 24. The input shell 22 has a pair of flat annular surfaces 26 and 28 formed on the inner surface. The tubrine 14 is secured to a hub 30 which in turn is splined to a converter output shaft 32. A single plate clutch 34 is splined to the hub 30 and has bonded thereto an annular friction surface 36 which cooperates with the annular surface 26 to provide a frictional drive connection between the input shell 22 and the clutch 34. Also drivingly connected to the hub 30 is an internal gear 38 which meshes with an external gear 40, both gears 38 and 40 are disposed in a housing 42. The housing 42 has formed on a portion thereof an annular friction surface 44 which cooperates with the flat annular surface 28 to form a friction drive between the housing 42 and the input shell 22.

The housing 42, internal gear 38 and external gear 40 cooperate to form a conventional internal/external type gear pump. A pair of fluid ports 46 and 48 are formed in the housing 42 and are separated by a crescent-shaped member 50. Such construction is conventional in an internal/external type gear pump. It is well-known that with internal/external type gear pumps, the housing can be held stationary and one of the gear members rotated to provide fluid displacement from one port, such as 48, to the other port 46. It is also known that with such pumps one of the gears, such as gear 38, can be held stationary while the housing 42 is rotated causing fluid to be displaced from port 46 to port 48.

The impeller 12 has a pump drive hub 52 which is operable to drive a conventional transmission control pump shown as 54. The pump 54 produces fluid flow and pressure for conventional transmission controls such as 56. Such controls are well-known and can be seen in U.S. Pat. No. 3,321,056 to Winchell et al, issued May 23, 1967, and assigned to the assignee of the present invention. It is also known that such transmission controls provide fluid pressure to operate the torque converter of the transmission. The fluid can be supplied from the transmission control to the torque converter through passage 58 and be returned by passage 60 or vice versa. If fluid pressure is directed to the transmission via passage 60, it will flow through the shaft 32 to a chamber 62 formed between the housing 42 and input shell 22. From this chamber it will cause the friction surface 44 to disengage from surface 28 and permit fluid to pass into a clutch disengagement chamber 64 formed between the input shell 22 and the clutch 34. Fluid pressure in chamber 64 will cause the clutch 34 to disengage such that fluid pressure will pass between the friction surface 36 and annular surface 26 into the clutch engagement chamber 66. From the engagement chamber 66 fluid pressure flows into the torque converter 10 from which it is exhausted between pump drive hub 52 and stator shaft 20 and through passage 58 to the transmission control. In this condition of operation, the clutch 34 is in the disengaged position and all drive forms pass through the torque converter 10 to the transmission, not shown. As can be seen in U.S. Pat. No. 3,693,478 to Malloy, issued Sept. 26, 1972, and assigned to the assignee of the present invention, the fluid pressure in the passages 58 and 60 can be interchanged between pressure and exhaust such that fluid pressure is supplied to passage 58 to the torque converter, it will pass from the torque converter into the clutch engagement chamber 66 thereby applying a pressure to one side of the clutch 34. The clutch 34 has formed therein a restriction 68 which permits fluid to flow through the clutch into the disengaging chamber 64 which supplies fluid pressure to the right side of housing 42 thereby engaging the friction surface 44 with annular surface 28 such that the housing 42 will be driven at a speed equal to the input shell 22. Since the gear 38 is connected to the turbine 14 via hub 30, the gear 38 will rotate at the speed of the turbine 14. Since, as is well-known with torque converters, there is a speed differential between the turbine 14 and the input shell 22, there will be a pumping action which will cause fluid to flow into port 46 and out of port 48 and through the shaft 32 and passage 60 to the transmission control. Depending upon the speed differential between the housing 42 and gear 38, the amount of fluid passing through the hydraulic device will be controlled. The hydraulic device can pass more fluid out of chamber 64 than can be supplied through restriction 68. Thus, when the speed differential between the housing 42 and gear 38 is high, a large amount of fluid will be removed from chamber 64 thereby creating a large differential across the clutch 34 to cause the clutch to engage. As the clutch engages, the turbine 14 and therefore gear 38 will increase in speed relative to the input shell 22, thus reducing the amount of fluid displaced by the hydraulic device. As the amount of fluid displaced from port 46 to port 48 is decreased, the pressure in the disengaging chamber 64 will increase since the flow into the chamber 64 through restriction 68 causes the pressure in chamber 64 to approach the pressure level of chamber 66. Thus, the clutch will seek a slipping engagement such that the speed differential between the input shell 22 and the clutch 34 is just sufficient to maintain the engaging force in clutch 34 required for that speed differential by removing fluid from chamber 64 at the same rate it is supplied. Should the clutch 34 attempt to become fully engaged, the flow through the hydraulic device would cease such that the pressure in chambers 64 and 66 would be balanced and there would be no engagement force on the clutch 34 so that it would be disengaged and start to slip which would, of course, create a speed differential for the hydraulic device to remove fluid at a controlled rate from the disengaging chamber 64.

The torque converter and clutch shown in FIG. 2 are substantially the same as that shown and described above for FIG. 1, such that the corresponding components will be given the same numerical designation. The basic differences between the mechanism shown in FIGS. 1 and 2 is that the restriction 68 is controlled by a reed valve 70 such that fluid cannot flow from chamber 64 to chamber 66 and therefore must bypass the clutch between surfaces 36 and 26, the housing 42 is secured to the input shell 22 by a plurality of fasteners such as 72 so that the housing 42 is continually rotated by the input shell 22, and a reed valve 74 is added to control fluid flow into chamber 64 such that the hydraulic device is bypassed when fluid pressure is supplied through the passage 60, as shown in FIG. 1, to the chamber 64 while reverse flow from chamber 64 must pass through ports 46 and 48. For disengaging operation, fluid is supplied through the shaft 32 to the bypass passage 76 which opens reed valve 74 to admit fluid to chamber 64 which causes clutch 34 to disengage so that fluid is supplied past the friction surface 36 to the torque converter 10 from which it is exhausted similar to that described above for FIG. 1. When it is desirable to engage the clutch, the fluid pressure is supplied to the torque converter between hub 52 and shaft 20, as described above for FIG. 1. Fluid from the torque converter passes into the engagement chamber 66 which causes the friction surface 36 to engage with annular surface 26. When this occurs, the fluid flows through restriction 68 opening reed valve 70 so that fluid pressure is available in chamber 64. The fluid pressure in chamber 64 is controlled in a similar manner to that described in FIG. 1 above, in that a speed differential is necessary between input shell 22 and clutch 34 so that the hydraulic device will pump fluid from chamber 64 to the transmission control. Again, it should be noted that if the clutch 34 becomes locked up, there will be no speed differential and therefore no fluid passage through the hydraulic device thus balancing the pressures in chambers 64 and 66 which will permit clutch disengagement and slippage. If slippage (speed differential) becomes excessive, the hydraulic device will pump more fluid from chamber 64 thereby increasing the pressure differential which in turn increases the clutch engagement force to arrive at the desired slipping condition. In both FIGS. 1 and 2, if the vehicle should go into a coast condition, such that the turbine 14 attempts to overrun the impeller 12, the hydraulic device will pump fluid from port 48 to port 46 thereby increasing the pressure in disengaging chamber 64 so that the clutch is released during coasting which is a desirable function.

Obviously, many modifications and variations are possible in light of the above teaching. It is, therefore, to be understood that within the scope of the appended claims the invention may be practiced otherwise than as specifically described.

The embodiments of the invention in which an exclusive property or privilege is claimed are defined as follows:

1. A control mechanism for a torque converter and slipping clutch wherein the torque converter has an input member and an output member and the clutch has a single plate member drivingly connected with the output member and slippingly engageable with the input member and wherein the engagement force of said clutch is proportional to the pressure differential across said single plate member, said control mechanism comprising; a positive displacement hydraulic translating unit including a body portion and an expansible chamber portion which portions cooperate to displace liquid through said hydraulic translating unit when relative motion is present between said portions, said body portion being drivingly connected with one of said torque converter members and having formed therein inlet and outlet liquid passages, said expansible chamber portion being drivingly connected with the other of said torque converter members whereby relative motion between said torque converter members causes liquid to be displaced through said hydraulic translating device from one side of said single plate member to exhaust thereby controlling the pressure on said one side of said single plate member to control the slipping engagement of said clutch.

* * * * *